United States Patent [19]
Takamatsu

[11] Patent Number: 6,041,899
[45] Date of Patent: Mar. 28, 2000

[54] ROTARY CONTROL DAMPER

[75] Inventor: Naokichi Takamatsu, Yokohama, Japan

[73] Assignee: Koyo Fastener Co., Ltd., Tokyo, Japan

[21] Appl. No.: 09/001,534

[22] Filed: Dec. 31, 1997

[30] Foreign Application Priority Data

Jan. 24, 1997 [JP] Japan .................................. 9-025821

[51] Int. Cl.[7] .................................................. F16D 57/00
[52] U.S. Cl. ............................................................ 188/290
[58] Field of Search ..................................... 188/293, 290, 188/322.5

[56] References Cited

U.S. PATENT DOCUMENTS

| | | | |
|---|---|---|---|
| 4,653,616 | 3/1987 | Mizusawa | 188/290 |
| 4,691,589 | 9/1987 | Arakawa | 74/573 F |
| 4,869,125 | 9/1989 | Saigusa | 74/574 |
| 5,301,775 | 4/1994 | Nedbal et al. | 188/290 |
| 5,718,309 | 2/1998 | Kariya | 188/290 |

FOREIGN PATENT DOCUMENTS 1-37236   11/1989   Japan .

*Primary Examiner*—Mark T. Le
*Assistant Examiner*—Jeffrey Woller
*Attorney, Agent, or Firm*—Pillsbury Madison & Sutro LLP

[57] ABSTRACT

A rotary control damper is described that includes a rotor comprising a spur gear and a plurality of rotary cylindrical bodies coaxially provided on a lower face of the spur gear. The damper also includes a stator comprising a plurality of stationary cylindrical bodies coaxially provided on an upper face of a base. The stationary cylindrical bodies rotatably engage the rotary cylindrical bodies of the rotor. An annular protrusion is provided on an outer periphery of the outermost outer race of the rotary cylindrical bodies. The protrusion engages a protrusion provided on the base of the stator outside the outermost inner race of the stationary cylindrical bodies. In addition, it slidingly engages the annular protrusion of the rotor in a direction of rotation of the rotor. The protrusion has a downward inclination face provided on at least one of the engaging faces between the annular protrusion and the engaging protrusion. A gap is formed which, between the rotary cylindrical bodies and the stationary cylindrical bodies, is filled with an oil.

4 Claims, 9 Drawing Sheets

ROTARY CONTROL DAMPER

BACKGROUND OF THE INVENTION

This invention relates to a rotary control damper adapted to move in a direction in which a rotary body such as a cassette holder where a cassette tape for a cassette tape recorder is contained or a compact disk holder where a compact disc for a compact disc player is contained is pivotally opened or closed while a rotary energy of the rotary body when it is opened or closed about a support pivot is absorbed or damped by viscosity resistance of an oil such as silicone grease with which the damper is filled.

What is illustrated in FIGS. 11 and 12 is a cassette holder into which the rotary control damper is incorporated. A cassette holder 2 is provided in a body of a cassette tape recorder 1 and serves to contain a cassette tape so that it can be taken out of the cassette holder 2. The cassette holder 2 is pivotally moved about a support shaft 3 relative to the body of the cassette tape recorder 1 so that it is opened or closed in a forward or backward direction.

A return spring 4 is provided about the support shaft 3 so that the cassette holder 2 is normally urged in the forward direction. A sector gear 5 is securely provided on a side face of the cassette holder 2. A rotary control damper 6 is securely provided on the body of the cassette tape recorder 1 and can rotate while it threadedly engages the sector gear 5.

The rotary control damper 6 has been disclosed in Japanese Utility Model Application Publication No. 37,236/1989 and has such a construction as shown in FIG. 13. The rotary control damper 6 comprises a driven gear 7 having two cylindrical protrusions 8 coaxially provided on a bottom of the driven gear 7. A bottomed case 9 has a cylindrical wall 10 in which the two cylindrical protrusions 8 of the driven gear 7 are placed. A space or gap exists between the outer cylindrical protrusion 8 and the cylindrical wall 10 and between the inner cylindrical protrusion 8 and an annular wall 10A provided inside of the cylindrical wall 10 on the bottomed case 9 that is filled with an oil 11. An annular shoulder 12 is formed on the inner periphery of the cylindrical wall 10 at the middle portion thereof so that an inner diameter of the upper portion of the annular shoulder 12 is larger than an inner diameter of the lower portion of the annular shoulder 12. Excess oil 11 placed in the space between the two cylindrical protrusions 8 and the walls 10 and 10A is stored in the upper portion of the annular shoulder 12.

When the cassette holder 2 is unlocked, it is pivotally opened about the support shaft 3 by the stability of the return spring 4 in the forward direction from the position indicated by the solid line of FIG. 11 to the position indicated by the dotted line thereof. Thus, the driven gear 7 of the rotary control damper 6 rotates because it engages the sector gear 5 moving together with the cassette holder 2. At that time, the rotary energy of the cassette holder 2 is absorbed through the driven gear 7 by the viscosity resistance of the oil 11 with which the gap between the cylindrical protrusions 8 and the cylindrical wall 10 or annular wall 10A is filled. Accordingly, the cassette holder 2 slowly opens.

In order to accomplish the aforementioned function of the rotary control damper 6, the gap between the cylindrical protrusions 8 of the driven gear 7 and the cylindrical wall 10 or the annular wall 10A of the bottomed case 9 should be desirably uniform all over the periphery thereof. However, as an external force is applied in a horizontal direction (as viewed in FIG. 13) to the driven gear 7 engaging the sector gear 5 of the rotary control damper 6 which moves together with the cassette holder 2 when it is opened, the cylindrical protrusions 8 move in a direction identical to the direction in which the external force is applied.

Although the oil 11 with which the gap between the cylindrical protrusions 8 of the driven gear 7 and the cylindrical wall 10 or the annular wall 10A of the bottomed case 9 makes such resistance as prevents the cylindrical protrusions 8 from moving, it is impossible to maintain the gap between the cylindrical protrusions 8 and the cylindrical wall 10 or the annular wall 10A uniform all over the periphery thereof. Thus, the cylindrical protrusions 8 of the driven gear 7 move in the direction identical to the direction in which the external force is applied. Therefore, a center of the cylindrical protrusions 8 of the driven gear 7 never accords with the center of the cylindrical wall 10 or the annular wall 10A of the bottomed case 9.

As a result, the driven gear 7 is deflected as it rotates and it cannot be pivotally operated in a smooth manner. Furthermore, since the size of the gap between the cylindrical protrusions 8 of the driven gear 7 and the cylindrical wall 10 or the annular wall 10A of the bottomed case 9 is uneven along its periphery, the thickness of the oil 11 with which the gap is filled is not uniform, which disadvantageously causes the rotary torque to be lowered.

In addition, since the oil 11 in that portion of the gap made narrower as the driven gear 7 rotates is compressed, there occurs a reaction force of the oil 11 which causes the wall face defining the gap which is filled with the oil 11 to be forced in an upward or a downward and a leftward or a rightward direction. Therefore, the driven gear 7 tends to be urged in a direction far away from the stationary bottomed case 9 (in an upward direction in FIG. 13). This possibly causes the cylindrical protrusions 8 of the driven gear 7 to be removed out of the cylindrical wall 10 or the annular wall 10A of the bottomed case 9 and therefore prevents the rotary control damper 6 from being pivotally operated in a smooth manner.

SUMMARY OF THE INVENTION

Accordingly, it is a principal object of the invention to provide a rotary control damper adapted to prevent a rotor from being removed out of a stator.

It is another object of the invention to provide a rotary control damper adapted to automatically align an axis of a rotor with that of a stator so that the rotor can be normally operated in a smoother manner and a rotary torque of the rotor can be prevented from being lowered.

In accordance with a present invention, there is provided a rotary control damper including a rotor comprising a spur gear and a plurality of rotary cylindrical bodies coaxially provided on a lower face of the spur gear. The present invention also includes a stator comprising a plurality of stationary cylindrical bodies coaxially provided on an upper face of a base and rotatably engaging the rotary cylindrical bodies of the rotor. An annular protrusion is provided on an outer periphery of the outermost outer race of the rotary cylindrical bodies. An engaging protrusion is provided on the base outside the outermost inner race of the stationary cylindrical bodies that slidingly engages the annular protrusion of the rotor in a direction of rotation of the rotor. The present invention also includes a downward inclination face provided on at least one of the engaging faces between the annular protrusion and the engaging protrusion whereby a gap between the rotary cylindrical bodies and the stationary cylindrical bodies is filled with an oil.

With the rotary control damper constructed in accordance with the aforementioned feature, the rotor of the rotary control damper tends to be forced in alignment with an axis of the rotor. Thus, since the rotor is automatically aligned with the stator, the rotary control damper can be operated without any deflection and in a smoother manner and therefore the rotary torque is prevented from varying.

Also, since the rotor engages the stator through the engaging protrusion of the stator, the rotor is effectively prevented from being removed out of the stator.

BRIEF DESCRIPTION OF THE DRAWINGS

The above and other objects and features of the invention will be apparent from the description of the invention which has been made with reference to the accompanying drawing in which.

DETAILED DESCRIPTION OF THE EMBODIMENTS OF THE INVENTION

Figure 1:
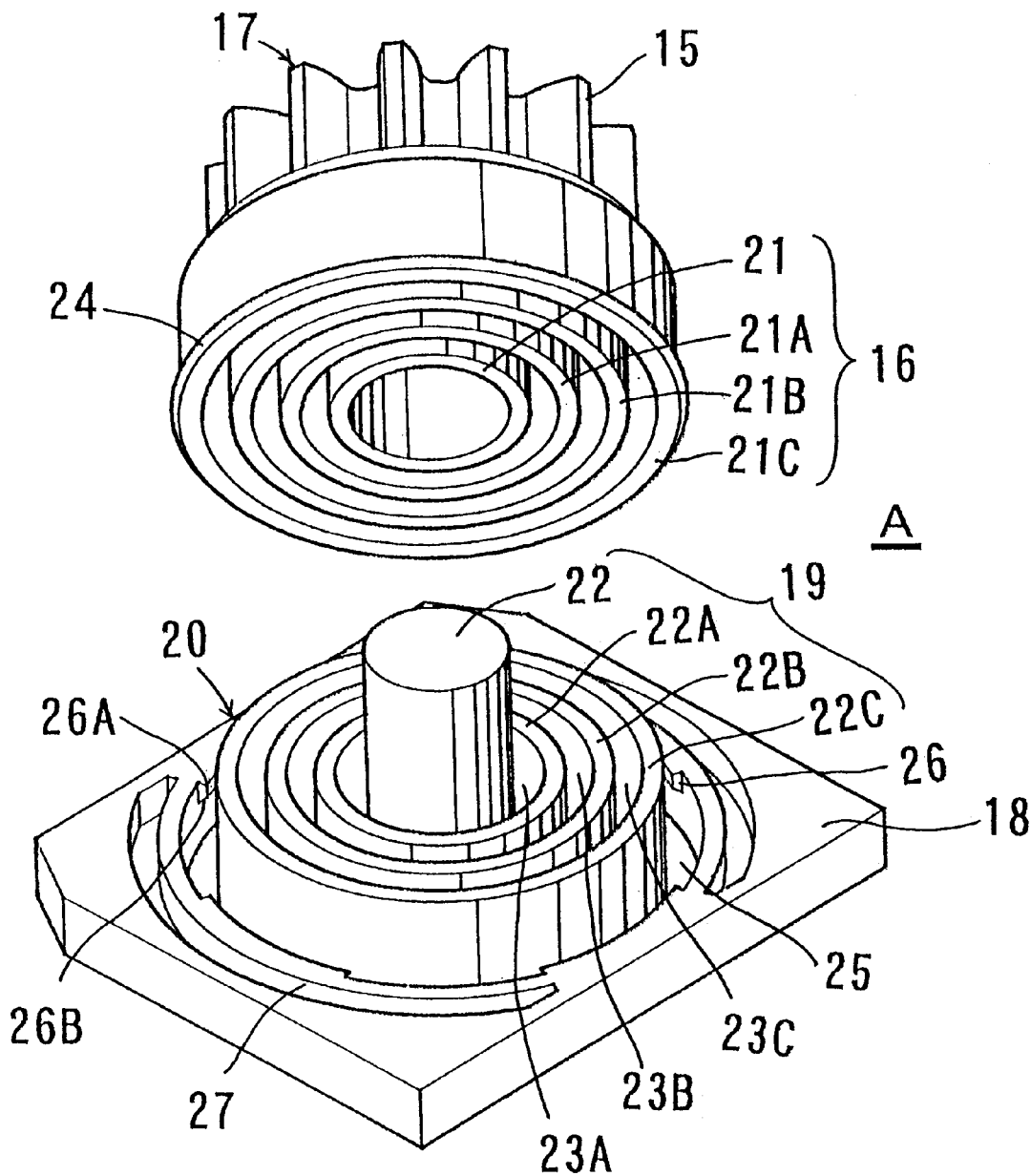
FIG. 1 is an explosively perspective view of a rotary control damper constructed in accordance with one embodiment of the present invention.

Now, an embodiment of the invention will be described and illustrated with reference to FIGS. 1 through 8 herein. A rotary control damper A constructed in accordance with the invention mainly includes a rotor 17 comprising a spur gear 15 and a plurality of coaxial rotary cyrindrical bodies 16 provided on a lower face of the spur gear 15 and opening downwardly. Rotary control damper A also includes a stator 20 comprising a plurality of coaxial stationary cylindrical bodies 19 provided on an upper face of a base 18 that rotatably engage the rotary cylindrical bodies 16 of the rotor 15. The plurality of cylindrical bodies 19 on base 18 open upwardly except for a support cylindrical body 22 which will be described later.

The rotary cylindrical bodies 16 of the rotor 17 include a bearing cylindrical hollow body 21 provided at a central portion of the rotor 17 and three outer race cylindrical bodies 21A, 21B and 21C provided outside of the bearing cylindrical body 21. The outer race cylindrical bodies 21A, 21B and 21C are coaxially provided far away at the same distance from each other in an outward direction from the bearing cylindrical body 21. The three outer race cylindrical bodies 21A, 21B and 21C have the same thickness.

The stationary cylindrical bodies 19 of the stator 20 include a support cylindrical body 22 that protrudes from the base 18 at a central portion. Stationary cylindrical bodies 19 have a diameter smaller than an inner diameter of the bearing cylindrical hollow body 21 of the rotor 17. Three inner race cylindrical bodies 22A, 22B are provided outside of the bearing cylindrical body 22 and have a height lower than that of the support cylindrical body 22. The inner race cylindrical bodies 22A, 22B and 22C are coaxially provided far away at the same distance from each other in an outward direction from the support cylindrical body 22. The distances between the adjacent ones of the three inner race cylindrical bodies 22A, 22B and 22C are set larger than the thickness of the three outer race cylindrical bodies 21A, 21B and 21C.

Thus, it will be noted that a first annular groove 23A, a second annular groove 23B and a third annular groove 23C are formed between the support cylindrical body 22 and the first inner race cylindrical body 22A of the stator 20, the first inner race cylindrical body 22A and the second inner race cylindrical body 22B, and the second inner race cylindrical body 22B and the third inner race cylindrical body 22C, respectively. The bearing cylindrical hollow body 21, the first outer race cylindrical body 21A and the second outer race cylindrical body 21B of the rotor 17 loosely engage the first annular groove 23A, the second annular groove 23B and the third annular groove 23C of the stator 20, respectively. It will be also noted that the support cylindrical body 22 of the stator 20 is provided at the position where the bearing cylindrical hollow body 21 of the rotor 17 engages the support cylindrical body 22 of the stator 20.

An annular protrusion 24 is formed on the outermost or third outer race cylindrical body 21C of the rotor 17 at the lower end and on the outer periphery thereof. As noted from FIG. 6 through FIG. 8, the annular protrusion 24 includes an upper downward inclination face 24A provided so as to be downwardly inclined from the outer periphery of the third outer race cylindrical body 21C in an outward direction. Annular protrusion 24 also includes a lower inclination face 24B inwardly extending from the edge of the upper downward inclination face 24A. In the illustrated embodiment, an inclination angle θ of the upper downward inclination face 24a is set at 30°.

An engaging groove 25 is provided in the base 18 of the stator 20 outside the third inner race cylindrical body 22 thereof in a coaxial manner relative to the support cylindrical body 22. The engaging groove 25 has such a width as allows the annular protrusion 24 to be inserted into the engaging groove 25.

Figure 2:
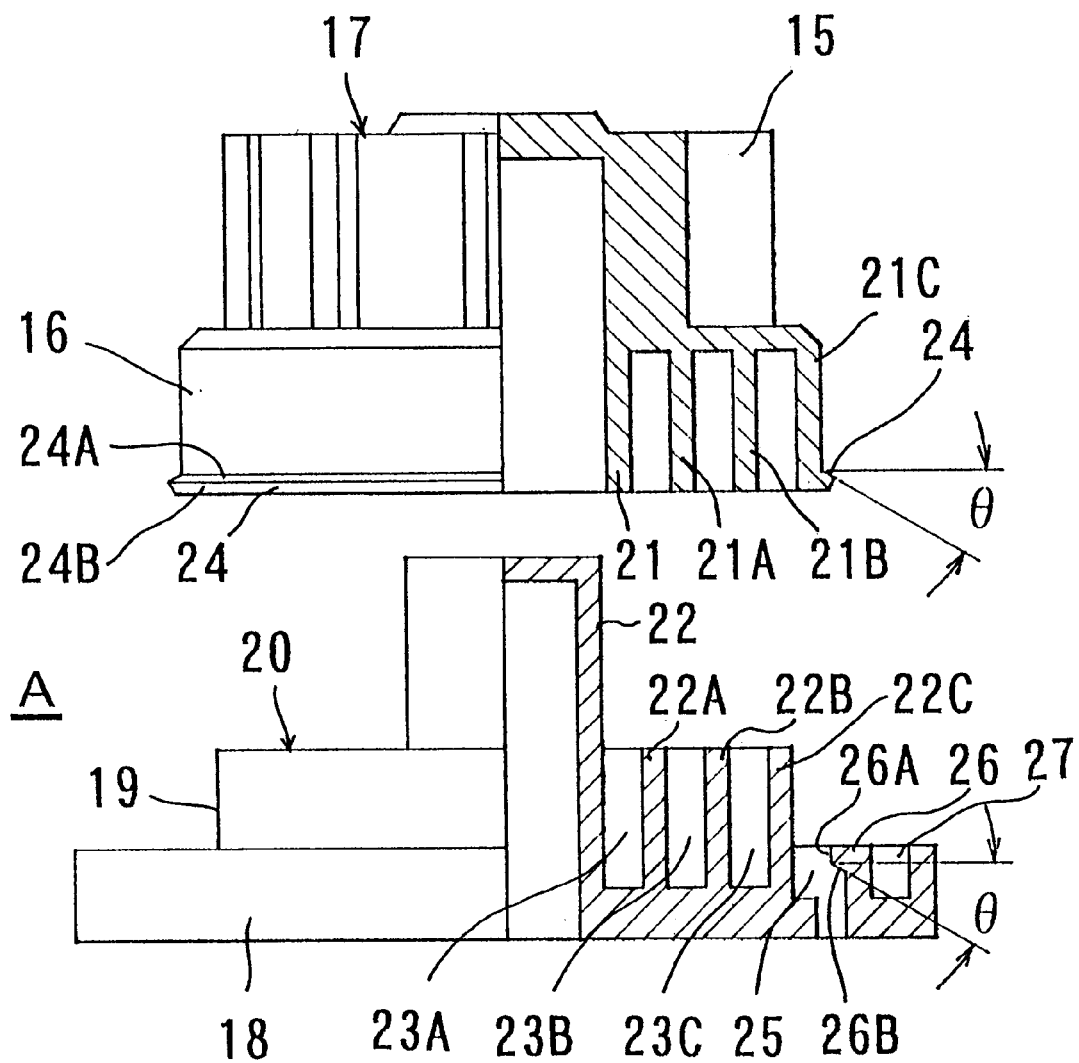
FIG. 2 is a front view of the disassembled rotary control damper of FIG. 1 with a half portion thereof broken away in a vertical cross section.
Figure 3:
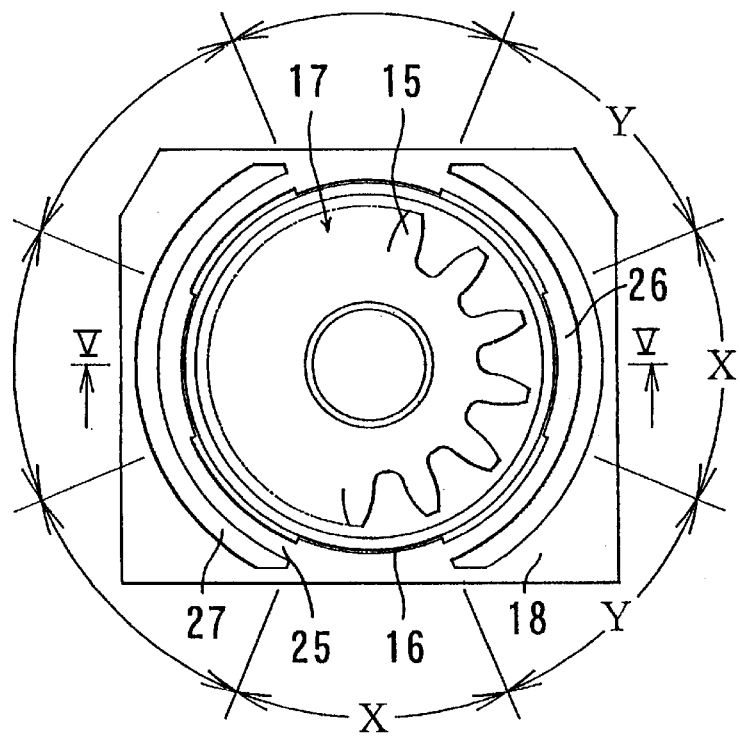
FIG. 3 is a plane view of the rotary control damper with portions thereof omitted.
Figure 4:
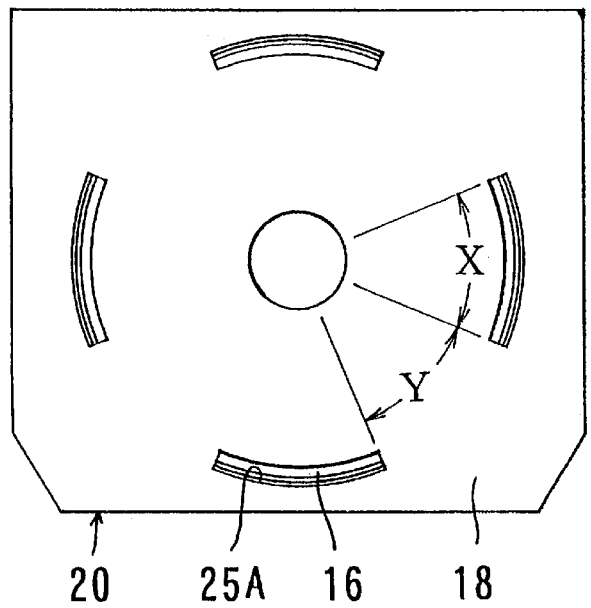
FIG. 4 is a bottom view of the rotary control damper of FIG. 1.

The engaging groove 25 has eight portions X, Y, X, Y - - - divided in a perihperal direction thereof by a uniform distance of 45° as shown in FIGS. 3 and 4. An engaging protrusion 26 includes protrusion portions provided at the alternately divided portions Y as shown in FIG. 3, respectively. The engaging protrusion 26 may comprises an inward downward inclination face 26B downwardly inclined in an inward direction from a vertical face 26A as shown in FIG. 2. An inclination angle θ of the inward downward inclination face 26B is set at 30° which is identical to the inclination angle θ of the upper downward inclination face 24A of the rotor 17.

Figure 5:
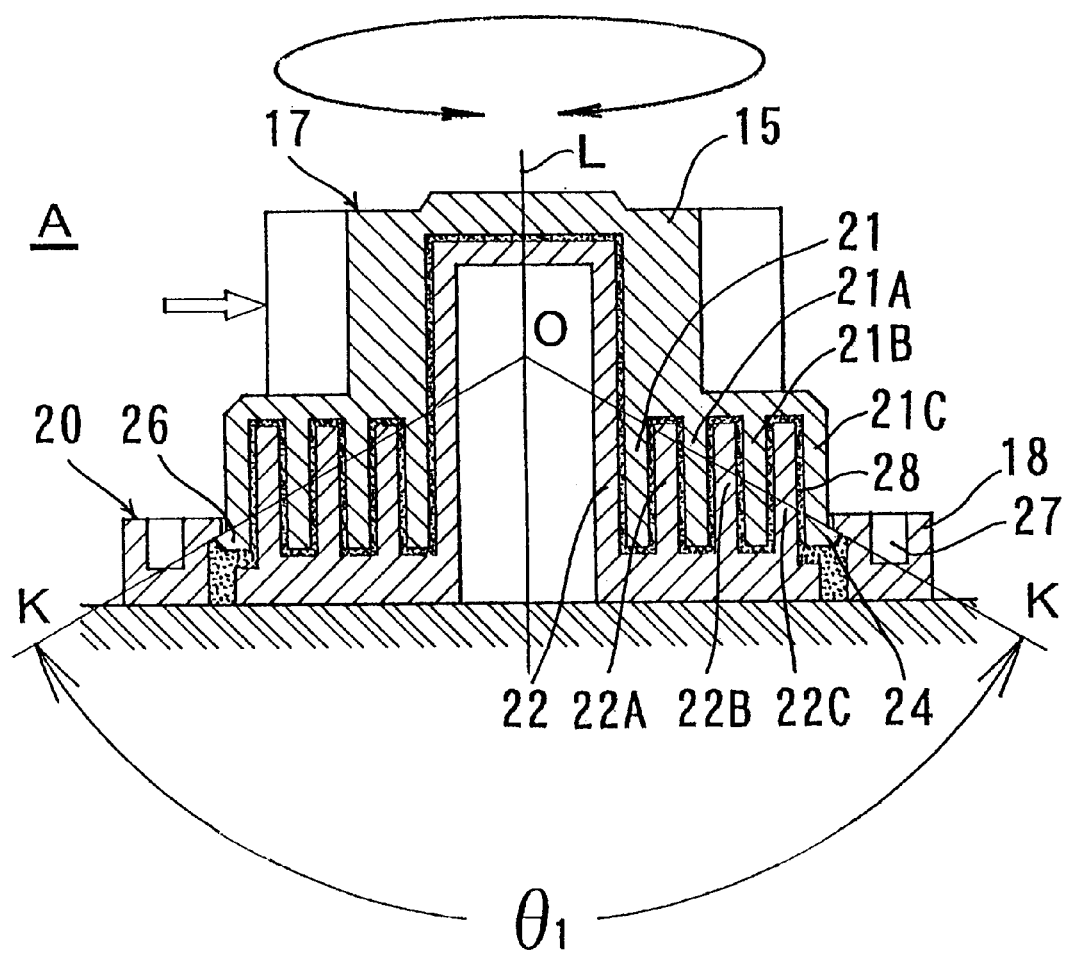
FIG. 5 is a cross sectional view of the rotary control damper taken along the line V—V in FIG. 3.

As noted from FIG. 5, inclination lines K, which pass through the engagement faces between the upper downward inclination face 24A of the annular protrusion 24 of the rotor 17 and the inward downward inclination face 26B of the engaging protrusions 26 of the stator 20, upwardly extend in a conical manner toward a center of rotation (axis L) of the rotor 17. Inclination lines K focus on one point O. A center angle θ1 of the cone formed by the inclination lines K is set at 120° in the illustrated embodiment.

Oil storage grooves 27 also may be provided on an upper face of the base 18 of the stator 20. Oil storage grooves 27 are positioned outside the third outer race cylindrical body 21C of the rotor 17 in a manner coaxial relative to the axis of the support cylindrical body 22 of the stator 20 as shown in FIGS. 1 through 3 and 5. The oil storage grooves 27 serve to contain oil overflowing from the space between the cylindrical bodies 16 and 19 when the rotary cylindrical bodies 16 of the rotor 17 engage the stationary cylindrical bodies 19 of the stator 20. The oil having been placed therebetween during assembling of the rotor 17 and the stator 20.

In case that the rotor 17 to the stator 20 are to be assembled to form the rotary control damper A, the rotary cylindrical bodies 16 of the rotor 17 engage the stationary cylindrical bodies 19 of the stator 20 with an oil 28 such as silicone grease placed therebetween.

As the annular protrusion 24 of the rotor 17 is forced into the engaging groove 25 of the stator 20 in a downward direction as viewed in FIG. 2, the engaging protrusion 26 is resiliently deformed in an outward direction while the annular protrusion 24 is resiliently deformed in an inward direction so that the annular protrusion 24 is allowed to be inserted into the engaging groove 25. Thus, as shown in FIG. 5, the support cylindrical body 22 of the stator 20 engages the bearing cylindrical hollow body 21 of the rotor 17 while the first through third outer race cylindrical bodies 21A through 21C of the rotor 17 engage the first through third annular grooves 23A through 23C of the stator 20, respectively. As noted from FIGS. 6 and 8, the annular protrusion 24 of the rotor 17 contacts with the engaging protrusion 26 of the stator 20.

As a result, a gap is formed between the rotary cylindrical bodies 16 of the rotor 17 and the stationary cylindrical bodies 19 of the stator 20. As shown in the vertical cross-section of FIG. 5, the gap has a winding rectangular appearance and is filled with oil 28.

Figure 6:
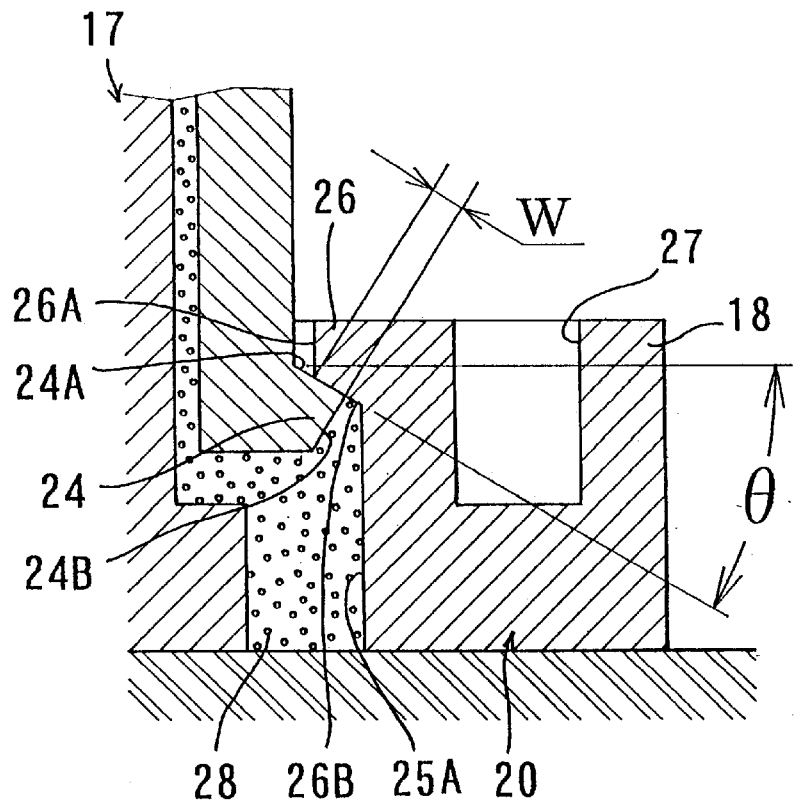
FIG. 6 is an enlarged cross sectional view of the gist of the rotary control damper of FIG. 1.
Figure 7:
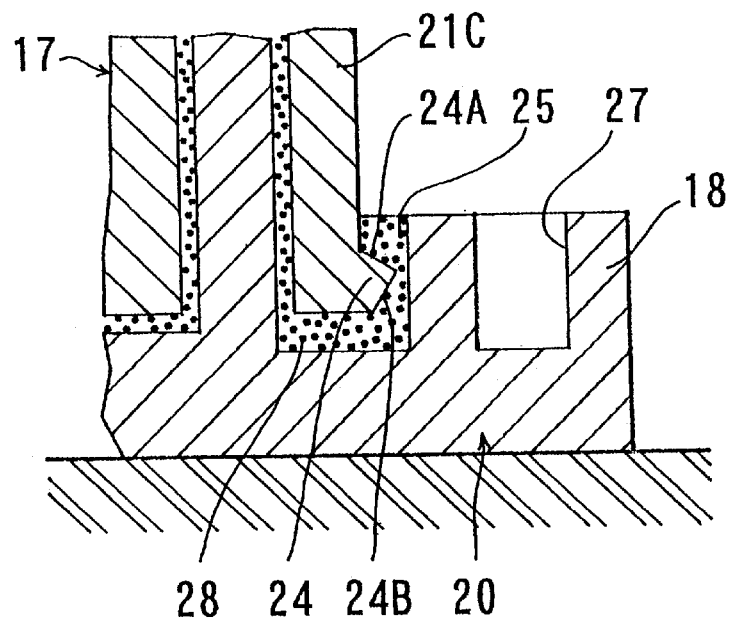
FIG. 7 is similar to FIG. 6, but illustrates in a cross sectional manner the gist of the rotary control damper of FIG. 1 taken at a different position.
Figure 8:
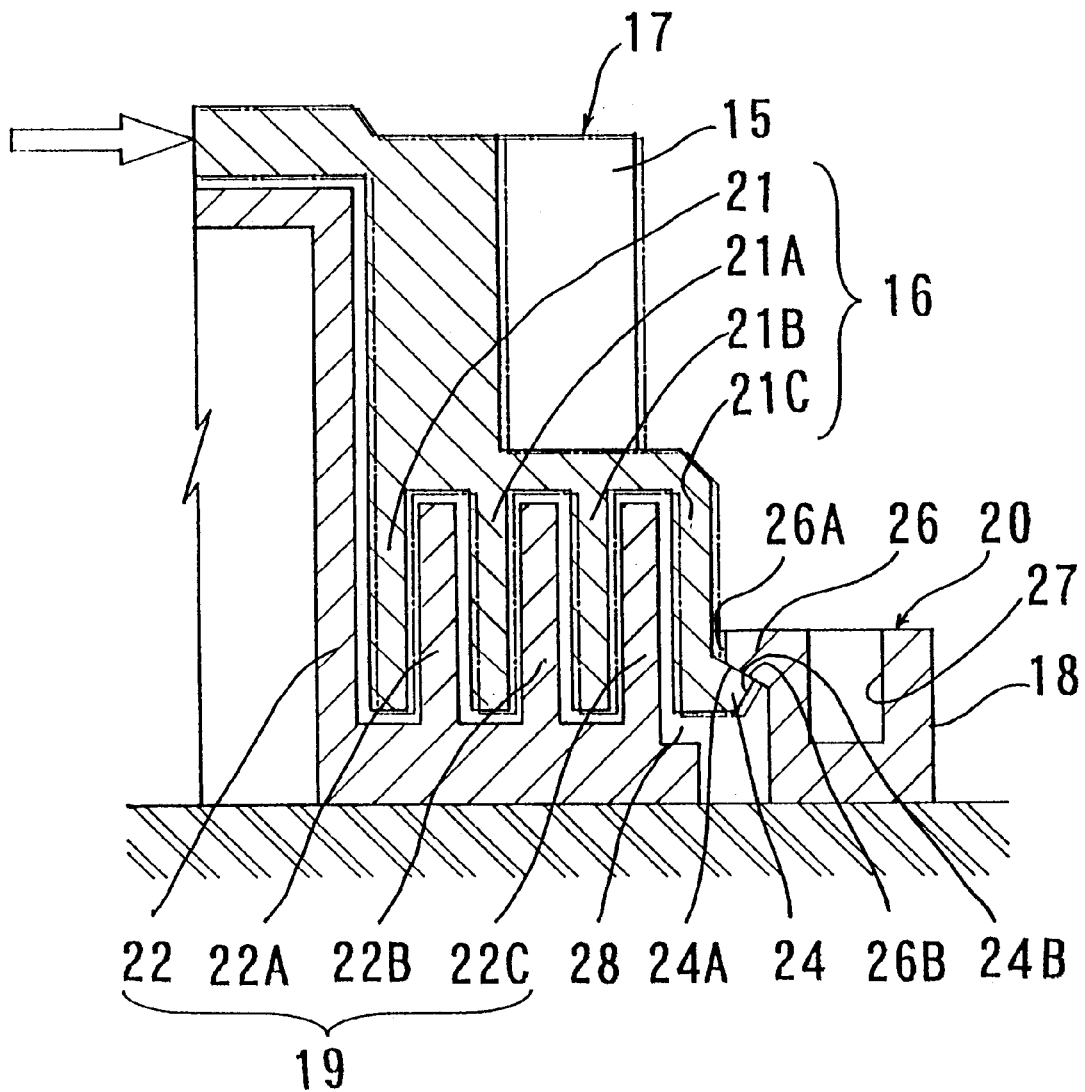
FIG. 8 illustrates in a cross sectional manner the rotary control damper of FIG. 1 when it is to be operated together with a device into which the rotary control damper is incorporated.

As noted from FIG. 6, the upper downward inclination face 24A of the annular protrusion 24 of the rotor 17 contacts with the inward downward inclination face 26B of the engaging protrusion 26 of the stator 20 over the width W. As noted from FIGS. 4 and 6, the engaging groove 25 has extension portions 25A vertically extending through the base 18 of the stator 20 at the positions corresponding to the engaging protrusion 26. The extension portions 25A serve to be used for removing or rapping a mold when the stator 20 is formed.

Figure 11:
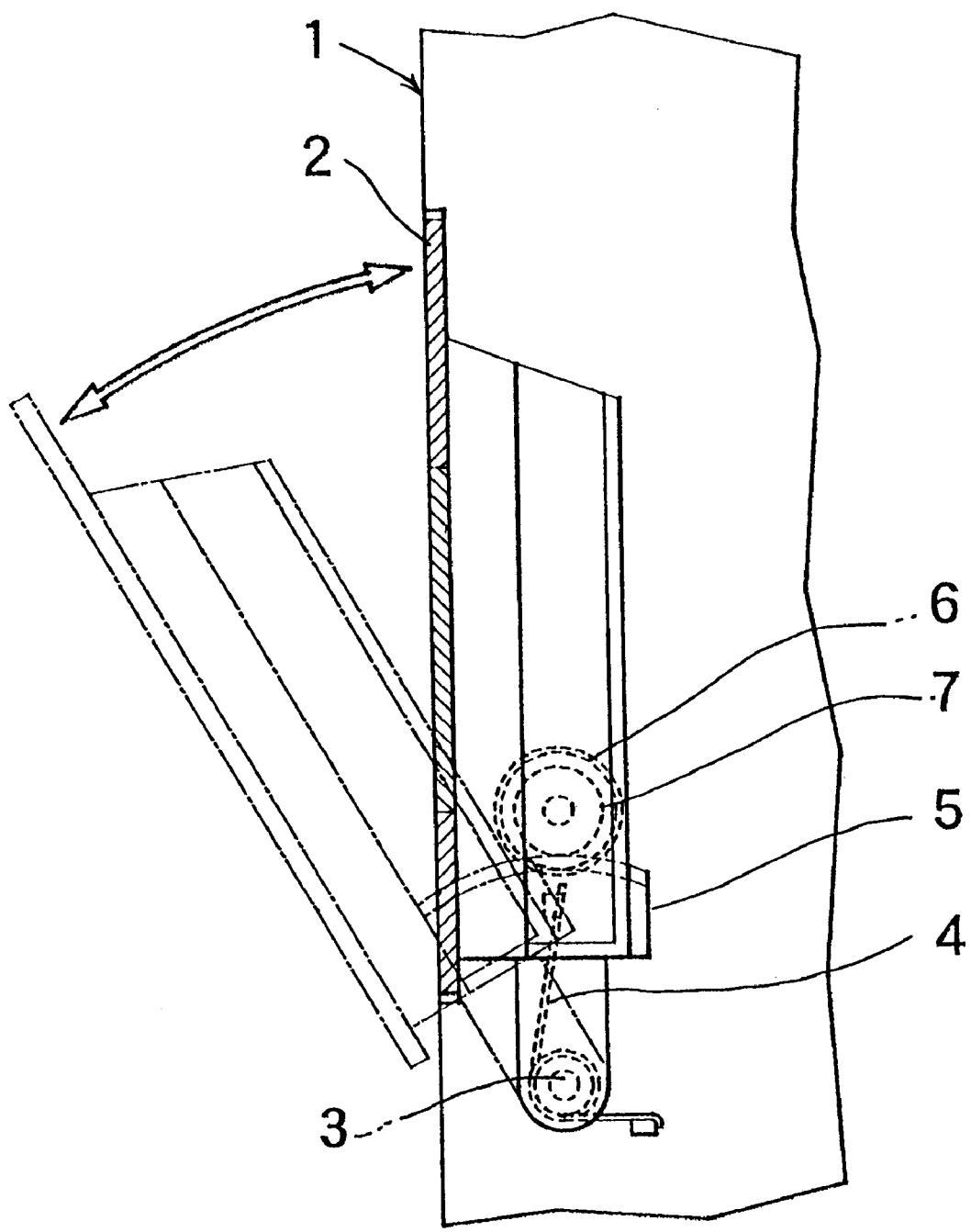
FIG. 11 is a vertically cross sectional view of a cassette holder into which the rotary control damper is incorporated.
Figure 12:
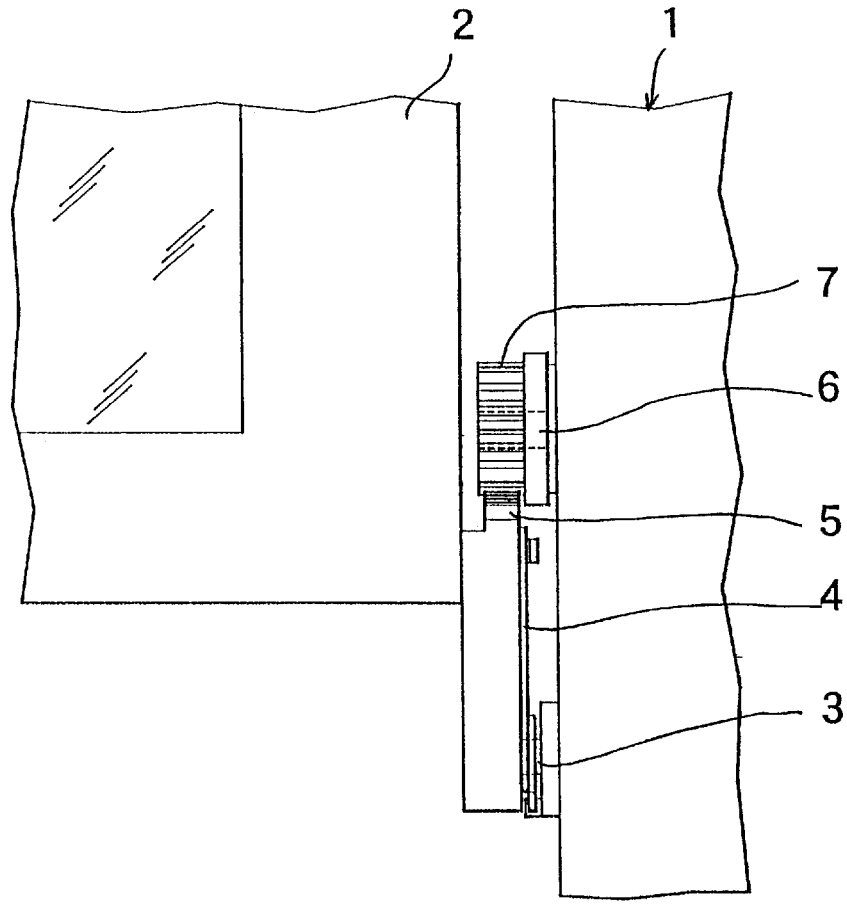
FIG. 12 is a front view of the cassette holder of FIG. 11.
Figure 13:
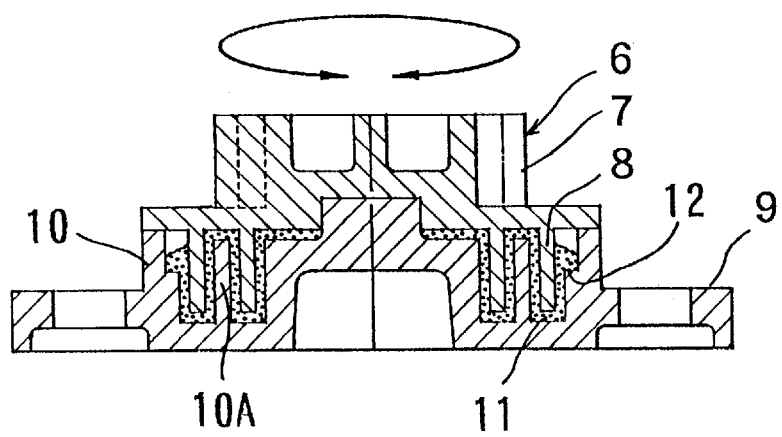
FIG. 13 is a cross sectional view of a rotary control damper constructed in accordance with a prior art.

The rotary control damper A is used at the state similar to that shown in FIGS. 11 and 12. As the cassette holder 2 is opened in the forward direction about the support shaft 3 by the stability of the return spring 4, an external force is applied to the spur gear 15 of the rotary control damper A which threadedly engages the sector gear 5 that moves together with the cassette holder 2. Thus, the rotary energy of the cassette holder 2 is absorbed or damped by the viscosity resistance of the oil 28 (with which the gap between the rotor 17 and the stator 20 is filled) so that the spur gear 15 of the rotor 17 slowly rotates. As a result the cassette holder 2 slowly opens.

As the rotary external force is applied to the spur gear 15 (as indicated by an arrow of FIG. 8), the rotor 17 has a force applied thereto in a horizontal direction identical to that in which the external force is applied. The force direction is normal to the axis L of the rotor 17 (see FIG. 5). The force applied to the rotor 17 causes the rotary cylindrical bodies 16 of the rotor 17 also to move in the same direction. This causes the oil 28 (with which the gap between the rotary cylindrical bodies 16 of the rotor 17 and the stationary cylindrical bodies 19 of the stator 20 is filled) to be compressed in accordance with the variation in the gap.

As the oil 28 is compressed, there occurs a reaction force of the oil 28 which causes the wall face defining the gap (which is filled with the oil 28) to be forced in upward or downward and leftward or rightward directions. Therefore, the rotor 17 tends to be urged in a direction far away from the stator 20 or in an upward direction as viewed in FIG. 8 along the axis L of the rotor 17. As a result, the upper face (the upper downward inclination face 24A) of the annular protrusion 24 of the outermost outer race cylindrical body 21C of the rotor 17 tends to apply an upward force on the lower face (inward downward inclination face 26B) of the engaging protrusion 26 of the stator 20.

Accordingly, as the rotor 17 moves toward the axis L of the rotor 17, the upper face (the upper downward inclination face 24A) of the annular protrusion 24 slidingly moves along the lower face (inward downward inclination face 26B) of the engaging protrusion 26 of the stator 20. The upper face moves in an upward direction toward the position indicated by the solid line FIG. 8 from the position indicated by the dotted line. Thus, it will be noted that the rotor 17 is automatically aligned with the stator 20.

In this way, the gap between the rotary cylindrical bodies 16 of the rotor 17 and the stationary clindrical body 22 of the stator 20 is maintained at a uniform distance all over the periphery thereof. This allows the oil 28 to be dispersed in a uniform amount all over the peripheries of the rotor 17 and the rotor 20 and therefore the rotary energy to be absorbed or damped. Thus, the rotary torque of the spur gear 15 never varies, which causes the spur gear 15 to rotate slowly and smoothly.

Figure 9:
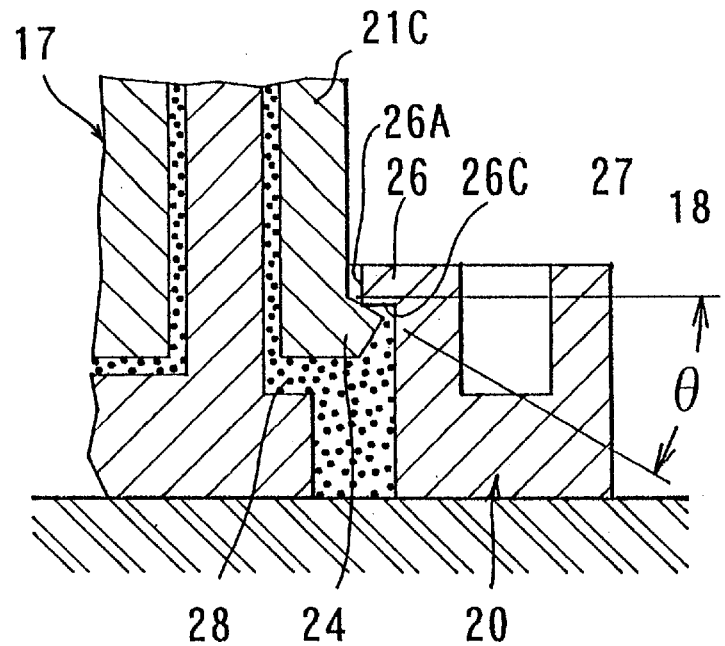
FIG. 9 is similar to FIG. 6, but illustrates in a cross sectional manner the rotary control damper constructed in accordance with another embodiment of the invention.

A rotary control damper constructed in accordance with another embodiment is illustrated in FIG. 9. The rotary control damper is substantially identical to that of the rotary control damper of FIGS. 1 through 8 except that the engaging protrusion 26 has a horizontal face 26C and not the inward downward inclination face 26B. The corner of the horizontal face 26C and the vertical face 26A engages the upper downward inclination face 24A of the annular protrusion 24 of the rotor 17. It will be understood that the rotary control damper of FIG. 9 also serves to automatically align the rotor 17 with the stator 20 in the same manner as described with respect to the rotary control damper of FIGS. 1 through 8.

Figure 10:
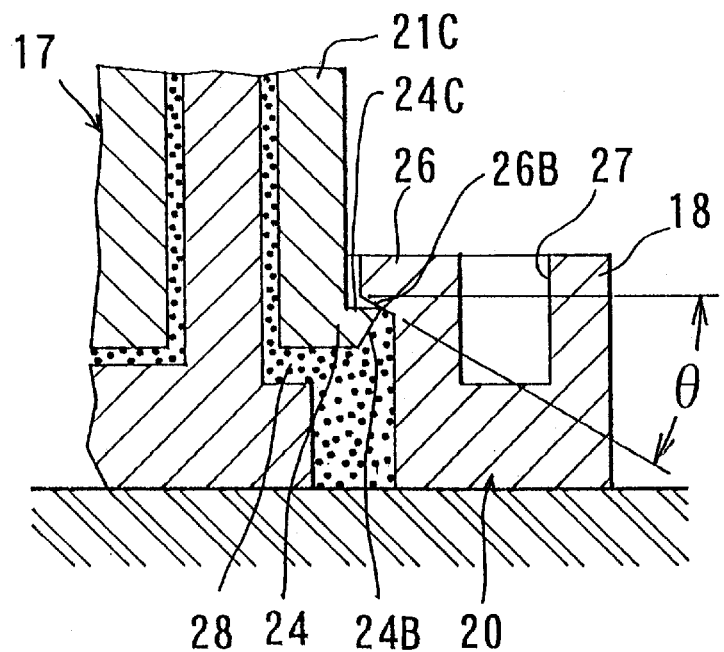
FIG. 10 is similar to FIGS. 6 and 9, but illustrates in a cros sectional manner the rotary control damper constructed in accordance with further embodiment of the invention.

A rotary control damper of FIG. 10 is constrcuted in accordanec with further embodiment of the invention. This rotary control damper is substantially identical to that of the rotary control damper of FIGS. 1 through 8 except that the annular protrusion 24 has a horizontal face 24C instead of the upper downward inclination face 24A (of FIGS. 1 through 9). The corner of the horizontal face 24C and the inward downward inclination face 24B of the rotor 17 engages the inward downward inclination face 26B of the engaging protrusion 26 of the stator 20. It will be understood that the rotary control damper of FIG. 10 also serves to automatically align the rotor 17 with the stator 20 in the same manner as described with respect to the rotary control dampers of FIGS. 1 through 8 and FIG. 9.

Although some preferred embodiments of the invention have been illustrated and described with reference to the accompanying drawings, it will be understood by those skilled in the art that they are by way of examples and that various changes and modifications might be made without departing from the spirit and scope of the invention, which is intended to be defined by the appended claims.

What is claimed is:

1. A rotary control damper comprising:
   a rotor having a spur gear and a plurality of rotary cylindrical bodies coaxially provided on a lower face of said spur gear;
   a stator having a plurality of stationary cylindrical bodies coaxially provided on an upper face of a base that rotatably engages said rotary cylindrical bodies on said rotor;
   an annular protrusion provided on an outer periphery of the outermost outer race of said rotary cylindrical bodies;
   an engaging protrusion provided on said base outside the outermost inner race of said stationary cylindrical bodies that slidingly engages said annular protrusion of the rotor in a direction of rotation of said rotor;
   a downward inclination face provided on at least one of engaging faces between said annular protrusion and said engaging protrusion;
   a gap between said rotary cylindrical bodies and said stationary cylindrical bodies;
   oil disposed within the gap; and
   a tolerance between said annular protrusion and said outermost inner race and between said engaging protrusion and said outermost outer race to permit said rotor and said stator to move both axially and radially.

2. The rotary control damper as set forth in claim 1, wherein said base has an engaging groove provided in a manner coaxial relative to said stationary cylindrical bodies outside the outermost inner race,
   wherein said engaging groove has a width such that said annular protrusion is insertable into said engaging groove, and
   wherein said engaging protrusion is formed on the inner periphery of an outer wall defining said engaging groove at an upper end thereof.

3. The rotary control damper as set forth in claim 2, wherein said engaging groove is uniformly divided into a plurality of divided groove portions, and
   wherein said engaging protrusion includes protrusion portions provided on the outer wall of alternate divided groove portions of said engaging groove.

4. The rotary control damper as set forth in claim 1, 2 or 3, further comprising:
   an oil storage groove in said base of said stator on an upper face thereof and outside the outermost outer race cylindrical body, wherein the oil storage groove is disposed in a coaxial manner relative to said stationary cylindrical bodies of said stator.

* * * * *